United States Patent [19]

Hopkins

[11] Patent Number: 5,401,048
[45] Date of Patent: Mar. 28, 1995

[54] SEAT FOR SLIDING ON SNOW AND ICE
[75] Inventor: Thomas R. Hopkins, Bartlesville, Okla.
[73] Assignee: S & T Promotions, Inc., Bartlesville, Okla.
[21] Appl. No.: 907,586
[22] Filed: Jul. 2, 1992
[51] Int. Cl.⁶ .............................................. B62B 15/00
[52] U.S. Cl. ..................................... 280/18; 280/18.1; D12/11; D21/228
[58] Field of Search .................... 280/18, 18.1, 16, 20, 280/21.1, 22; D12/11; D21/228, 224

[56] References Cited

U.S. PATENT DOCUMENTS

| | | | |
|---|---|---|---|
| D. 236,256 | 8/1975 | Hellman | D12/11 |
| D. 271,606 | 11/1983 | Corey et al. | D21/228 |
| D. 281,679 | 12/1985 | Marquesen | D12/11 |
| 2,219,905 | 10/1940 | Prickman | 280/12 |
| 3,034,800 | 5/1962 | Campbell | 280/18 |
| 3,145,029 | 8/1964 | Ollanketo | 280/16 |
| 3,294,410 | 12/1966 | Tomasino, Jr. | 280/18 |
| 3,374,003 | 3/1968 | Fulsom | 280/18 |
| 3,522,952 | 8/1970 | Uttenthaller | 280/18 |
| 3,884,490 | 5/1975 | Hellman | 280/18 |
| 4,170,367 | 10/1979 | Rickenbacher | 280/18 |
| 4,349,208 | 9/1982 | Merrill | 280/12 K |
| 4,603,870 | 8/1986 | Monreal | 280/18 |
| 4,609,201 | 9/1986 | Flachsmann | 280/20 |
| 4,666,171 | 5/1987 | Sellers | 280/18 |
| 4,718,684 | 1/1988 | Rabatic | 280/20 |
| 4,909,524 | 3/1990 | Paine | 280/18 |

FOREIGN PATENT DOCUMENTS

| | | | |
|---|---|---|---|
| 0115297 | 8/1984 | European Pat. Off. | |
| 1964299 | 6/1971 | Germany | 280/18 |
| 2246164 | 3/1974 | Germany | 280/18 |

OTHER PUBLICATIONS

"The Great American Wish Book", Sears Roebuck and Co., 1990 Edition, pp. 528–529.
"Zoom Boggan" by Wilmare, Inc., 1989.
English Abstract, German Published Application 2,246,164.

Primary Examiner—Eric D. Culbreth
Attorney, Agent, or Firm—Charles W. Stewart

[57] ABSTRACT

A sheet for transporting a seated rider over snow, ice and the like. The sliding sheet comprises a unitary sheet having a seat portion, a handle portion and an interconnecting portion and is designed for improved sledding performance.

10 Claims, 2 Drawing Sheets

SEAT FOR SLIDING ON SNOW AND ICE

BACKGROUND OF THE INVENTION

This invention relates to a sheet for transporting a seated rider over snow, ice and the like.

There are many pieces of equipment which can be used to assist people to slide over slippery surfaces such as snow and ice. Examples of such equipment include slats which can be placed on the feet (skis), sheets of wood, metal or plastic which can be laid or sat upon (toboggan), and frames having two or more runners or skis mounted thereon (sled). In most sled or sledge designs, it is intended for the user to place his legs and feet inside the perimeter of the device. Two other commonly used recreational sliding devices include rubber inner tubes or like-shaped inflatable devises made of plastic and large dish like items made of metal or plastic. Unlike the intended use of most other sled designs, the user of a dish or inner-tube often rides with his legs and feet hanging outside its perimeter. Unfortunately, in these later examples, there is little, if any, steering control or comfort for the user. Because the user can easily tip over and because the smooth-bottomed tube or dish has no rotational control, injury can easily occur. Furthermore, the top surface of a dish is hard and smooth making it difficult for a rider to maintain contact with the surface when the dish is in use. Also, there is little comfort to the user of a dish having a slick surface. Further still, this type of sled usually lacks a handle for the user to grip. Even if there is a handle, the lack of steering control tends to neutralize the advantage of the handle.

One sled design intended to resolve certain of the problems associated with prior art sleds is that described by Schmatz (German patent 2,246,164); however, the Schmatz sled has certain problems that are inherent in its design. One such problem, for example, results from its cushion design, as specifically stated by Schmatz, which only develops its functional shape as a sled at the moment the user sits upon the device. There are numerous other problems with the Schmatz sled in addition to those associated with the cushion containing the foamed plastic feature. For instance, the requirement that the foamed plastic be welded between two molded plastic shapes eliminates the possibility of using certain injection molding techniques to economically manufacture the sled, and to thereby lower the cost of manufacture. Additionally, because of the excessive thickness and the lack of rigidity created by the cushion and foam filling, the steering and control of the sled is made difficult.

Another example of a prior art prior art sled includes a toboggan-like sled consisting of a thin mat of plastic which a rider kneels upon or sits upon with his legs outstretched. Often, a toboggan-like sled has built-in handles with which a driver lifts the front part of the mat to permit sliding, but they generally have no runners to permit steering.

The patent literature describes modified dish-like sleds having tub-like shapes and shapes and runners and channels to aid in directional control (see, for example, U.S. Pat. Nos. 4,603,870 and 4,666,171). They are designed to carry a person in a kneeling, sitting or prone position. All body parts are retained within or immediately above the sled structure. As such, they are relatively heavy devises which are difficult to drag up a slope and are stiff and bulky, thus being inconvenient for storage in a garage or automobile. Some sliding vehicles attempt to solve the problem of bulkiness by being articulated or foldable platforms (U.S. Pat. Nos. 4,170,367 and 4,609,201). Such designs, have the disadvantage of being subject to damage or accelerated wear at the relatively fragile folding areas. Moreover, folding alone does not address the weight problem of larger sleds designed to hold the rider in a kneeling or prone position. Furthermore, the use of folding means result in not permitting the use of flexible type devices that allow the sled to form with the contours of a human rider.

Known arrangements of hand grips on sleds, if present, vary from simple knotted ropes or loops of rope fixed to the sled, to depressions, lips or holes stamped or molded into the body of the sled. Many of these hand grips elements have the disadvantage of not being well placed on the sled. They create strain and discomfort and, in some instances, can cause injury when being used. It is desirable, therefore, for a sliding vehicle to have anthropomorphically designed had grips.

Many sliding platforms also have upper surfaces that are smooth and slippery thus making them difficult to use.

SUMMARY OF THE INVENTION

It is thus an object of this invention to provide a sledge with improved performance but which is economical to manufacture.

Another object of this invention is to provide a sledge that is light weight and compact thereby permitting easy storage and transportation.

A still further object of this invention is to provide a sledge that does not have the performance problems associated with sledges which utilize cushions and folding devices.

A yet further object of this invention is to provide a sledge that can be made substantially from a single type of material.

Accordingly, this invention includes a unitary sheet for transporting a seated rider over surfaces such as, for example, snow or ice. The unitary sheet includes a planar seat section, a handle section and an interconnecting section. The planar seat section has a maximum width, a bottom surface suitable for sliding on another surface, and a top surface suitable for seating said seated rider. The handle section provides a means for gripping by the seated rider. The interconnecting section has a minimum width, a first end extending from the minimum width to the planar seat section, and a second end extending from the minimum width to the handle section. The interconnecting section has the features of being both flexible in the vertical direction from the plane of the planar seat section and shaped so as to permit close contact of the interconnecting section with the crotch area of the seated rider when the interconnecting section is flexed in the vertical direction.

BRIEF DESCRIPTION OF THE DRAWINGS

Other aspects, objects and advantages of this invention will become apparent from a study of this disclosure, the appended claims and the drawings in which:

DETAILED DESCRIPTION OF THE INVENTION

Figures 1, 2:
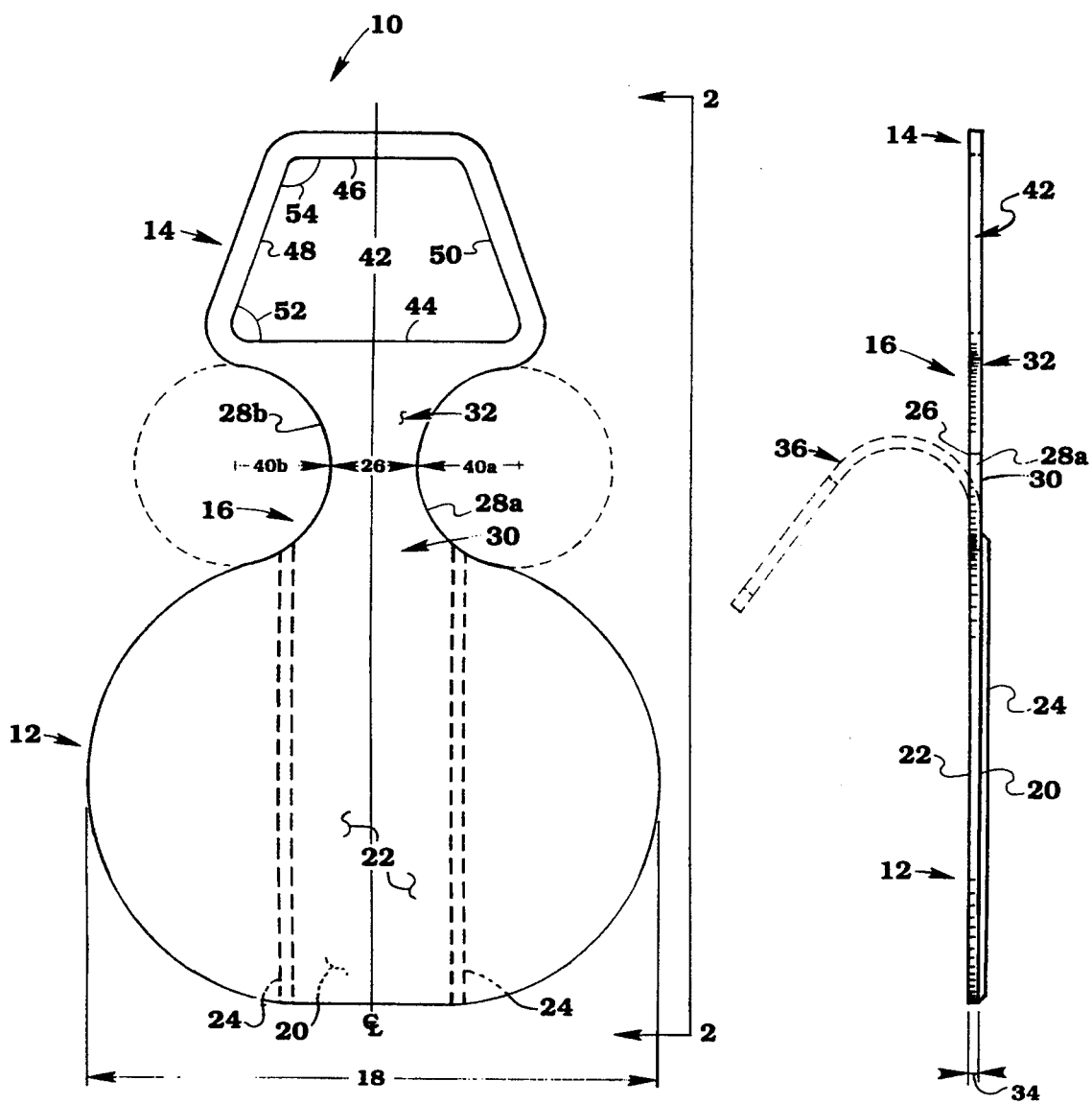
FIG. 1 is a top plan view of a unitary sheet in accordance with a preferred embodiment of the invention.
FIG. 2 is an elevation view of the unitary sheet of FIG. 1 along line 2—2.

The invention described herein has numerous novel features provided to solve problems associated with prior art sledges. The inventive sledge is a unitary sheet having three sections. One advantage from the use of a unitary sheet is that folding devices are eliminated thereby minimizing manufacturing costs and other problems associated with the use of folding devices. Also, the unitary sheet allows certain sections or portions of the sledge or sliding device to be shaped so as to permit the sections to form to the contour of various parts of the body of a human rider. The three sections or portions of the unitary sheet can include, but are not limited to, a planar sheet section, a handle section and an interconnecting section. Thus, the unitary sheet can comprise, consist of, or consist essentially of a planar sheet section, a handle section and an interconnecting section.

The planar seat section of the unitary sheet can have any shape that will effectively protect the user, or seated rider, from injury to his buttocks when the inventive sledge is utilized. The planar sheet preferably has a bottom surface and a top surface. The bottom surface is generally used as a surface for sliding upon, or maintaining contact with, another surface, which preferably includes surfaces of snow or ice, or both, but can include other surfaces. Therefore, the bottom surface is generally suitable for sliding upon another surface because of its relatively low coefficient of friction. The bottom surface of the planar seat section can also preferably have imposed thereon at least one runner means for imparting directionality of travel to the sledge when it is in use. The runner means can be any means suitable for achieving the desired function of aiding in controlling the direction of sliding when the unitary sheet is in use, including, for example, runners, grooves, depressions and channels. These runner means will generally extend longitudinally along a major portion of the length of the bottom surface of the planar seat section, and in the case where there is more than one runner means imposed upon the bottom surface, the runner means will be transversely spaced.

While any shape can be used to provide a planar seat section which suitably provides a desired sliding surface and seating surface, it is preferred for the planar seat to have a maximum width, and most preferably, the shape of the planar seat section is to be elliptic or oval. The maximum width of the planar seat section is generally from about 200 millimeters to about 900 millimeters. Preferably, the maximum width of the planar seat section is from about 250 millimeters to about 600 millimeters, and most preferably, the maximum width is from 300 to 450 millimeters.

The top surface of the planar seat section is generally used as the surface upon which the user of the sled, or the seated rider, places his buttocks when the sled is in use. Thus, certain features of this invention becomes an important, if not critical, aspect of the invention in that they provide protection to various anatomical parts of the rider's body and in that certain portions of the unitary sheet have features which conform to other anatomical parts of the rider's body. It is desirable to have imposed upon the top surface of the planar seat section a roughened surface adapted to increase the frictional grip of the surface so as to make it more difficult for a rider seated upon the top surface of the planar seat section from sliding off the surface. Thus, it is preferred for the top surface to have imposed thereon a textured surface so as to provide a relatively high coefficient of friction for maintaining a seated rider in contact with the top surface of the planar seat section.

The interconnecting section of the unitary sheet is that portion that lies between the handle section and the planar seat section. It is important to the operation of the unitary sheet for the interconnecting section to be somewhat rigid in the transverse direction while simultaneously being flexible in the vertical direction from the plane of the planar seat section. These particular characteristics of the interconnecting sections have been found to assist in providing particularly improved sledding performance by the rigidity in the transverse direction so as to permit steering control of the planar seat section when in use while simultaneously allowing for flexibility of the interconnecting section in the vertical direction from the planar seat section so as to permit the pulling of the handle section by a seated rider to bring the interconnecting section into close contact between the legs of the seated rider. It also can be desirable for the interconnecting section to have such an elongation that the handle section can be pulled to within close proximity, or contact, of the seated rider's abdominal area. For these particular features of the invention to be most effective, it is generally desirable for the interconnecting section to have a shape that can fit comfortably between a seated rider's legs, and preferably, the interconnecting means can have a shape such as to permit close contact of the interconnecting section with the crotch area of the seated rider when the interconnecting section is flexed in the vertical direction by the seated rider pulling the handle section toward his body. Thus, generally, the interconnecting section will have a minimum width which is preferably smaller, or narrower, than the maximum width of the planar seat section.

One unique aspect of the invention is that it is made of a sheet material, preferably a single sheet, and generally having a thickness and comprising a substantially single material such as a polymer compound. Any suitable substantially single material can be used to form the unitary sheet, provided that it gives a unitary sheet having the characteristics as described herein. The sheet material can include, for example, polymeric materials, polyethylene, polypropylene, polymethylpentene, polystyrene, polycarbonate, polyacrylic, nylon, polyvinylchloride, polyectene, cellulosic, polysaccarides, and mixtures of two or more thereof. The preferred sheet material is a material which can suitably be used in standard injection molding devices for the manufacture of the unitary sheet with the most preferred sheet material comprising polyethylene. The thickness of the sheet should generally be less than 100 millimeters, but ordinarily, the thickness of the sheet can be between about 0.1 millimeter to about 50 millimeters. Preferably, however, the thickness of the sheet can be between about 0.5 millimeter to about 20 millimeter, and most preferably, the thickness will be between 1 millimeters and 10 millimeters.

The thickness of the sheet gives a unitary sheet having an outer edge; therefore, the interconnecting section will have two outer edges, which oppose each other. A further preferred embodiment of the interconnecting section is one in which it has a first end extending from the minimum width up to the planar seat section and a second end extending from the minimum width up to the handle section. It is more preferred for the first end and the second end of the interconnecting section to respectively have a first width and a second width that are greater than the minimum width of the interconnecting section. These differences in widths will provide an interconnecting section with a shape such that each of the two opposing outer edges of the interconnecting section defines a curve in an inward direction toward each other. It is a contemplated aspect of the invention for the first width and second width to increase, as their distances from the minimum width of the interconnecting section increases, in such a relationship so that the curves defined by the two edges of the interconnecting section can substantially be defined by a radius. This radius can be in the range of from about 30 millimeters to about 150 millimeters, preferably, from about 40 millimeters to about 100 millimeters, and most preferably, from 50 millimeters to 80 millimeters.

The minimum width of the interconnecting section, as earlier indicated herein, is less than the maximum width of the planar seat section. Generally, the minimum width of the interconnecting section is in the range of from about 10 millimeters to about 150 millimeters, but preferably, the minimum width is in the range of from about 25 millimeters to about 100 millimeters. Most preferably, the minimum width of the interconnecting section is in the range of from 40 to 75 millimeters.

The handle section of the unitary sheet has a shape that suitably provides hand grip means for gripping, or grasping, by the seated rider. Generally, the handle section will define an opening having any defined shape that suitably provides or serves as the hand grip means of the sled. Such suitable shapes can include, but is not limited to, triangles, squares, rectangles other than squares, trapezoids, polygons having more than four sides, circles, and ellipses. It has been found that, because of the unique features of the unitary sheet, to achieve its optimal performance, it is important for the opening of the handle section to have a substantially, but not perfectly, trapezoidal shape. This unique shape, in combination with the unique features of the unitary sheet, gives an anthropomorphically compatible handle section which provides for an effective and compatible hand grip means. The trapezoidal shape of the handle section opening also has the unique benefit of locating the rider's hands in such an orientation so as to provide for ease of steering of the unitary sheet when in use. The trapezoidal shape achieves this by orienting the forces imposed by the rider in the proper direction to thereby provide for effective steering control. Generally, it is desired for the parallel sides of the trapezoidal opening to have dimensions of from about 50 millimeters to about 225 millimeters, but preferably, from about 75 millimeters to about 200 millimeters, and most preferably, from 100 to 175 millimeters. The desired angles formed by the nonparallel sides with the parallel sides of the trapezoidal opening can be in the range of from about 50 degrees to about 130 degrees, but preferably, from about 60 degrees to about 120 degrees, and most preferably, from 70 degrees to 110 degrees. The nonparallel sides of the trapezoidal opening can be substantially equal in length having lengths in the range from about 25 millimeters to about 150 millimeters, but preferably from about 50 millimeters to about 125 millimeters, and most preferably, from 75 to 100 millimeters. The longest of the two parallel sides of the trapezoidal opening is positioned so as to be the closest of the two sides to the interconnecting section.

Now referring to FIG. 1 and FIG. 2, there is shown a unitary sheet 10 having a planar seat section 12, a handle section 14, and an interconnecting section 16. Planar seat section 12 has a maximum width 18, a bottom surface 20, and a top surface 22. Imposed or formed on bottom surface 20 are at least one runner means 24. The interconnecting section 16 has a minimum width 26 and two outer edges 28a and 28b which define the shape of interconnecting section 16. First end 30 of interconnecting section 16 has a first width that is greater than minimum width 26. First end 30 extends from minimum width 26 to planar seat section 12. Second end 32 of interconnecting section 16 has a second width that is greater than minimum width 26. Second end 32 extends from minimum width 26 to handle section 14. The opposing two outer edges 28a and 28b define a curve in an inward direction toward each other and can generally be defined by radius 40a and 40b.

Depicted in FIG. 2 is a side elevation view of unitary sheet 10 having thickness 34 when unitary sheet 10 is not in use. Also depicted in FIG. 2 by broken lines is interconnecting section 16 when it is in the flexed position 36 for use.

Handle section 14 defines opening 42 which generally has a trapezoidal shape with long parallel side 44 and short parallel side 46. The non-parallel sides 48 and 50 of the trapezoidal opening 42 form angles 52 and 54 respectively with long parallel side 44 and short parallel side 46. Handle section 14 provides hand grip means for gripping by a seated rider.

Figure 3:
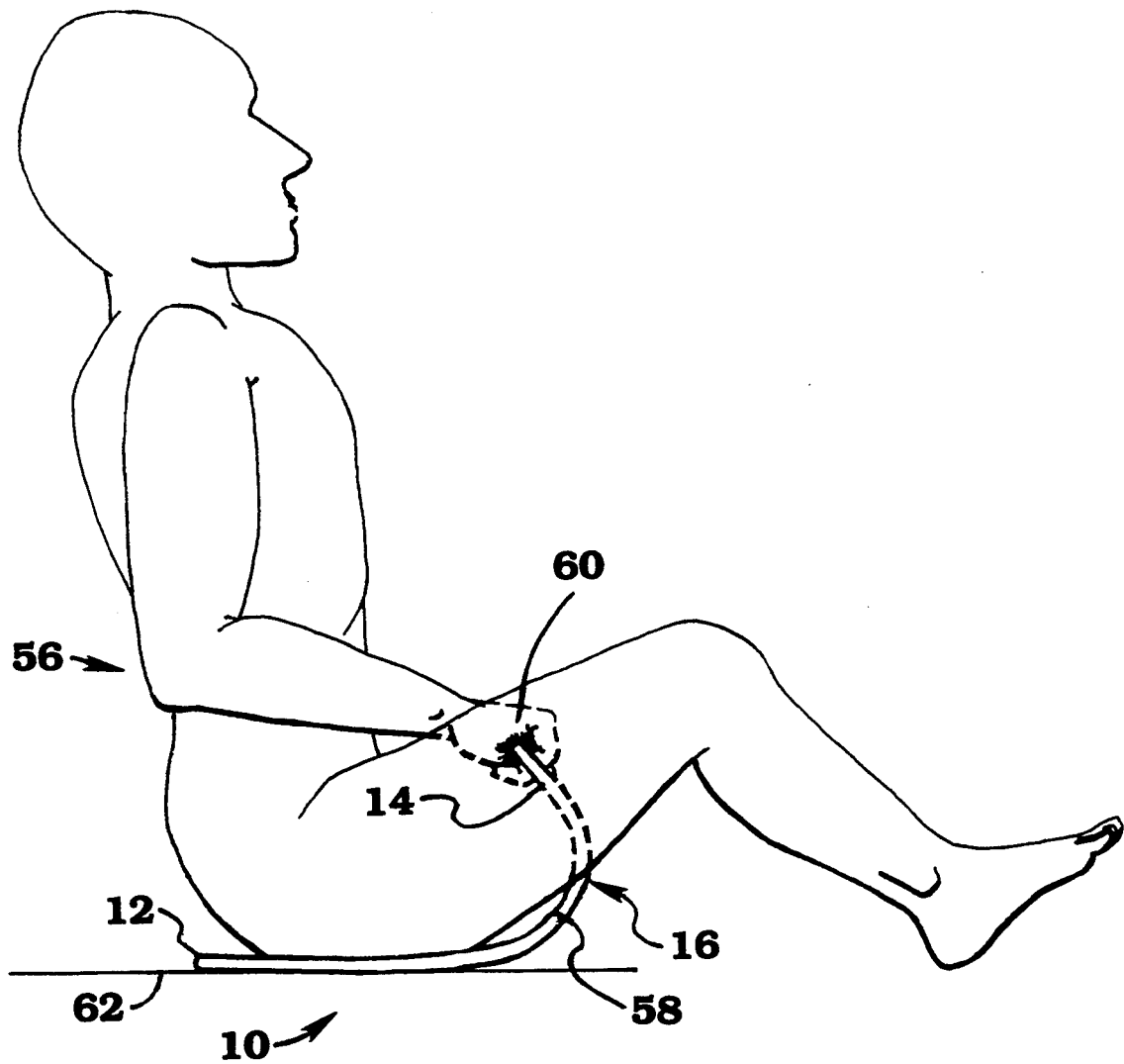
FIG. 3 is a perspective view showing the unitary sheet with a seated rider thereon.

FIG. 3 depicts unitary sheet 10 when it is in use with seated rider 56. Interconnecting portion 16 is flexed in the vertical direction from the plane of planar seat section 12 so as to come within close contact with crotch area 58 of seated rider 56. Seated rider 56 flexes interconnecting section 16 by pulling handle section 14 with his hands 60. Planar seat section 12 is in contact with another surface 62 when in use by seated rider 56.

While this invention has been described in detail for purposes of illustration, it is not to be construed as limited therapy but is intended to include all measurable variations and modifications within the scope and spirit of the described invention and appended claims.

That which is claimed is:

1. A unitary sheet for transporting a seated rider over a surface, which comprises:
  a planar seat section having a maximum width, a bottom surface suitable for sliding on said surface, and a top surface suitable for seating said seated rider;
  a handle section providing hand grip means for gripping by said seated rider; and
  an interconnecting section having a minimum width, a first end extending from said minimum width to said planar seat section, a second end extending from said minimum width to said handle section, and wherein said interconnecting section is flexible in a vertical direction from the plane of said planar seat section and wherein said interconnecting section has a shape so as to permit close contact of said interconnecting section with the crotch area of said seated rider when said interconnecting section is flexed in said vertical direction, and wherein said unitary sheet has a substantially uniform thickness in the range of from about 0.1 millimeter to about 50 millimeters and comprises substantially a single material of polyethylene.

2. A unitary sheet as recited in claim 1, wherein said minimum width of said interconnecting section is narrower than said maximum width of said planar seat section.

3. A unitary sheet as recited in claim 2, wherein said interconnecting section has two outer edges which define said shape of said interconnecting section and wherein said first end has a first width that is greater than said minimum width and said second end has a second width that is greater than said minimum width thereby providing said shape of said interconnecting section such that said two outer edges each define a curve in an inward direction toward each other.

4. A unitary sheet as recited in claim 3 wherein said maximum width is in the range of from about 200 millimeters to about 900 millimeters; said minimum width is in the range of from about 10 millimeters to about 150 millimeters; and said thickness is between about 0.5 millimeters to about 20 millimeters.

5. A unitary sheet as recited in claim 4, wherein said first width increases with an increasing distance from said minimum width and said second width increases with an increasing distance from said minimum width so that each said curve has a radius.

6. A unitary sheet as recited in claim 5 wherein said radius is in the range of from about 30 millimeters to about 150 millimeters.

7. A unitary sheet as recited in claim 6, wherein said handle section defines an opening serving as said hand grip means.

8. A unitary sheet as recited in claim 7, wherein said opening has a shape that is substantially trapezoidal.

9. A unitary sheet as recited in claim 8, wherein imposed upon said bottom surface of said seating section is at least one runner means for imparting directionality of travel.

10. A unitary sheet as recited in claim 9 wherein said shape that is substantially trapezoidal comprises parallel sides having dimensions from about 50 millimeters to about 225 millimeters; non-parallel sides having lengths in the range of from about 25 millimeters to about 150 millimeters; and angles formed by the non-parallel sides with the parallel sides in the range of from about 50 degrees to about 130 degrees.

* * * * *